US010659665B2

(12) United States Patent
Bauer

(10) Patent No.: US 10,659,665 B2
(45) Date of Patent: May 19, 2020

(54) CAMERA MODULE FOR A VEHICLE

(71) Applicant: Robert Bosch GmbH, Stuttgart (DE)

(72) Inventor: Nikolai Bauer, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 15/499,618

(22) Filed: Apr. 27, 2017

(65) Prior Publication Data
US 2017/0339322 A1 Nov. 23, 2017

(30) Foreign Application Priority Data
May 18, 2016 (DE) .................. 10 2016 208 549

(51) Int. Cl.
*H04N 5/225* (2006.01)

(52) U.S. Cl.
CPC ......... *H04N 5/2254* (2013.01); *H04N 5/2253* (2013.01); *H04N 5/2257* (2013.01)

(58) Field of Classification Search
CPC ... B60R 11/04; B60R 2011/0026; B60R 1/00; B60R 2001/1253; B60R 1/12; B60R 2011/004; B60R 2300/105; B60R 1/04; G05B 13/028; G05B 19/4183; G05B 19/4184; G05B 19/41845; G05B 19/4185; G05B 19/41865; G05B 19/41875; G05B 2219/32287; G05B 2219/35001
See application file for complete search history.

(56) References Cited

U.S. PATENT DOCUMENTS

| 9,431,442 | B2* | 8/2016 | Vittu | H01L 21/565 |
| 9,487,159 | B2* | 11/2016 | Achenbach | B60R 11/04 |
| 9,491,342 | B2* | 11/2016 | Winter | H04N 5/2252 |
| 9,596,387 | B2* | 3/2017 | Achenbach | H04N 5/2251 |
| 9,819,845 | B2* | 11/2017 | Winter | H04N 5/2252 |
| 2006/0222300 | A1* | 10/2006 | Frenzel | G02B 7/021 385/88 |
| 2008/0279547 | A1 | 11/2008 | Wu et al. | |
| 2009/0122426 | A1 | 5/2009 | Cheng | |
| 2009/0128684 | A1* | 5/2009 | Apel | H01L 27/14618 348/360 |
| 2009/0322929 | A1* | 12/2009 | Webster | H01L 27/14618 348/340 |
| 2013/0321696 | A1* | 12/2013 | Bae | H04N 5/2252 348/372 |
| 2014/0160284 | A1* | 6/2014 | Achenbach | H04N 5/2251 348/143 |
| 2014/0226012 | A1* | 8/2014 | Achenbach | B60R 11/04 348/148 |
| 2014/0354878 | A1* | 12/2014 | Winter | H04N 5/2252 348/374 |

(Continued)

FOREIGN PATENT DOCUMENTS

| KR | 20090004287 A | 1/2009 |
| KR | 20110014834 A | 2/2011 |

(Continued)

*Primary Examiner* — Alison Slater
*Assistant Examiner* — Kehinde Abimbola
(74) *Attorney, Agent, or Firm* — Norton Rose Fulbright US LLP; Gerard Messina

(57) ABSTRACT

A camera module which is particularly provided for vehicles. It includes a lens holder, a shaped part, and a sensor carrier. The lens holder is fastened on the sensor carrier via the shaped part with an adhesive).

10 Claims, 10 Drawing Sheets

(56) References Cited

U.S. PATENT DOCUMENTS

| | | | |
|---|---|---|---|
| 2015/0124098 A1* | 5/2015 | Winden | H04N 5/2253 |
| | | | 348/148 |
| 2015/0334278 A1* | 11/2015 | Apel | G02B 7/023 |
| | | | 348/148 |
| 2016/0116758 A1* | 4/2016 | Nomura | H04N 5/23258 |
| | | | 359/557 |
| 2016/0224848 A1* | 8/2016 | Oh | G06K 9/00805 |
| 2016/0225809 A1* | 8/2016 | Vittu | H04N 5/2257 |
| 2017/0054882 A1* | 2/2017 | Winter | H04N 5/2252 |
| 2017/0182944 A1* | 6/2017 | Achenbach | H04N 5/2251 |
| 2017/0230554 A1* | 8/2017 | Winden | H04N 5/2253 |
| 2017/0289420 A1* | 10/2017 | Reiche | H04N 5/2253 |
| 2018/0143395 A1* | 5/2018 | Takahashi | H04N 5/2254 |

FOREIGN PATENT DOCUMENTS

| | | |
|---|---|---|
| KR | 101220651 B1 | 1/2013 |
| KR | 20130057262 A | 5/2013 |

* cited by examiner

CAMERA MODULE FOR A VEHICLE

RELATED APPLICATION INFORMATION

The present application claims priority to and the benefit of German patent application no. 10 2016 208 549.2, which was filed in Germany on May 18, 2016, the disclosure of which is incorporated herein by reference.

FIELD OF THE INVENTION

The present invention relates to a camera module for a vehicle.

Various configurations of cameras are discussed in the related art. In DE 10 2014 103 473 A1, for example, a sensor carrier is attached with the aid of a screw joint.

SUMMARY OF THE INVENTION

The present invention relates to a camera module which is in particular provided for vehicles. It includes a lens holder and a sensor carrier, on which a shaped part is attached. The lens holder is fastened to the shaped part with the aid of an adhesive.

This specific embodiment offers the advantage that an optimal attachment of a lens holder on a sensor carrier via an adhesive joint is possible with the aid of an intermediate piece or a shaped part. A lens holder is understood to mean a device which is configured to accommodate at least one optical element. A sensor carrier is understood to mean a device that is configured to accommodate an image sensor, if necessary also using additional attachment parts. A shaped part is understood to mean a device that is attachable on the sensor carrier and is configured to provide a joint between the sensor carrier and the lens holder. The sensor carrier may be configured as a circuit board, for example. An image sensor may be integrated into the sensor carrier or provided on the sensor carrier as a separate component. Both the image sensor and the shaped part may be attached on the sensor carrier with the aid of a reflow method.

Due to the configuration according to the present invention, the adhesive area is situated very close to the sensor carrier, whereby the overall design becomes slimmer and the necessary installation space is reduced. Moreover, the screw joint and a possibly necessary additional component for holding the lens holder are dispensed with. Since screws, boreholes and minimum thicknesses of the lens holder are no longer required, consequently a miniaturization of the entire configuration/camera module is possible. The maximum diameter of the camera module may theoretically be reduced to the diameter/outer circumference of the lens holder. Due to the miniaturization, the use of the camera module is more versatile, and the production, storage and logistics become more cost-effective.

The configuration according to the present invention moreover offers the option of a multi-axis orientation of the lens holder or of a lens system attached in the lens holder relative to the sensor carrier or an image sensor attached on the sensor carrier. Furthermore, a compact design and a stable joint between the individual components are made possible. After the adhesive has cured, the lens holder and the shaped part are connected in a form-locked manner.

In one specific embodiment of the present invention, the lens holder has at least one recess. This recess is configured to accommodate the adhesive and at least one portion of the shaped part.

The recess in the lens holder offers the big advantage that the adhesive does not run even at low viscosity and thus remains in the desired position. In this way, a higher adhesive column may be created in the z direction than would be possible without the recess. The z direction describes the direction of a vector which is situated perpendicularly on a surface of the lens holder facing the sensor carrier and points in the direction of the sensor carrier. The direction corresponds to the direction of the main axis of the lens holder. Since moreover a portion of the shaped part may be accommodated in the recess, more play is available in the orientation of the lens holder and the sensor carrier with respect to one another in the z direction due to the amount and/or level of the adhesive. Consequently, tolerances in a lens system possibly accommodated in the lens holder and/or tolerances of an image sensor possibly accommodated by the sensor carrier and/or tolerances of the lens holder and/or of the sensor carrier and/or of the shaped part may be better compensated for.

In one advantageous specific embodiment of the present invention, the recess is formed on a surface of the lens holder facing the sensor carrier.

This specific embodiment offers the advantage that the geometry of the shaped part may have a very simple design. Alternatively, a recess which is formed, for example, on a surface of the lens holder facing away from the sensor carrier would also be conceivable. In this case, the profile of the shaped part could resemble a hook which, proceeding from the sensor carrier, wraps around a portion of the lens holder in its recess.

In one advantageous specific embodiment of the present invention, the recess has a continuous design, so that it surrounds the lens holder along an entire circumference of the lens holder. It is in particular provided that the recess surrounds the lens holder along the circumference of the lens holder facing the sensor carrier.

This specific embodiment offers the advantage that a very stable joint between the lens holder and the shaped part and/or the sensor carrier is possible. Furthermore, hermetic sealing of the image sensor or of the interior of the camera module is possible with the aid of the adhesive.

In one further specific embodiment of the present invention, the lens holder has at least two recesses, the at least two recesses being provided spatially separated from one another.

This specific embodiment offers the advantage that a flexible arrangement of the recesses on the lens holder is possible. In this way, for example, the installation space on the lens holder and the sensor carrier may be optimally utilized. For example, the lens holder may also have three recesses, which are each provided offset 120° from one another along a circumference of the lens holder facing the sensor carrier. With the aid of three recesses, a joint is created which is very stable with respect to bends/lateral loading of the lens holder and/or sensor carrier. Thus, specific embodiments in which the sensor carrier has three or more recesses are also conceivable. In one advantageous specific embodiment of the present invention, the lens holder has four recesses, which are each offset 90° from one another or are situated on corners or rounded corners of the lens holder. Again, it is possible to ensure a stable arrangement. Moreover, portions of the shaped part which are not accommodated in the recesses may be usefully utilized to achieve other objects. It is possible, for example, to accommodate a sensor carrier in a form-locked manner with the aid of these portions, so that a fixed relationship is created between the shaped part and the sensor carrier, and possibly the image sensor, which is advantageous for the orientation of the components to one another.

If at least one portion of the shaped part may be accommodated in the recess down to the bottom of the recess, the entire depth of the recess may be used for orienting the lens holder to the sensor carrier and/or the shaped part in the z direction. If the portion is configured so that it may only be accommodated to a certain depth, this depth may correspondingly be used for the orientation in the z direction. If the portion is configured so that sufficient lateral play (relative to the surface of the sensor carrier on which the image sensor is attachable) is present in the recess, moreover an orientation in the lateral direction is possible. Furthermore, the portion may be configured so that sufficient play is present in the recess, so that tilting about an arbitrary axis is possible. The overall design thus creates the option of a stepless orientation of the lens holder to the sensor carrier and/or the shaped part, wherein both a displacement in all spatial directions and tilting about an arbitrary axis are possible.

In one advantageous specific embodiment of the present invention, the shaped part includes at least two portions, which may be accommodated in the at least two recesses. The two portions may be accommodated simultaneously in both recesses, so that at least one respective portion may be accommodated in a respective recess.

This specific embodiment offers the advantage that the configuration/the structure of the shaped part may be optimally matched to the configuration/the structure of the lens holder and/or sensor carrier. The portions may be configured as complementary structures to the recesses, a certain play being advantageous for a variable orientation of the lens holder to the sensor carrier.

The portions may be implemented differently, for example in the form of two positive contours, which, e.g., may be configured as protruding roundings. Specific embodiments in which the shaped part includes three or more portions are also conceivable. In one advantageous specific embodiment of the present invention, the shaped part includes four portions, which may be accommodated in at least one recess. In this way, a very stable joint between the shaped part and the lens holder is possible.

In one advantageous specific embodiment of the present invention, the shaped part is configured so that a form fit is formed between the sensor carrier and the shaped part with the aid of the shaped part.

This specific embodiment of the present invention offers the advantage that the sensor carrier may be fixedly attached on the shaped part with the aid of the same, and consequently an improved orientation of the components to one another is possible. Moreover, no separate fasteners are required to attach the shaped part to the sensor carrier. In this way, processes may be simplified and expedited, and costs for additional parts may be saved. In particular, it may be provided that the shaped part includes lower projections and upper projections, which form the form fit between the sensor carrier and the shaped part. In particular, it is provided that the form fit is created by a bending over the upper projections. The shaped part is consequently configured so that a form fit is formed between the sensor carrier and the lens holder with the aid of the shaped part when the adhesive has cured.

In addition, a camera module is claimed, in which the sensor carrier carries an image sensor, and radiation striking the image sensor is at least partially conducted through a lens, which is held by the lens holder.

Furthermore, a lens holder for installation in a camera module is claimed. The lens holder has at least one recess, which is configured to accommodate adhesive and at least one portion of a shaped part in order to position the lens holder with respect to the sensor carrier and attach it to the shaped part and/or the sensor carrier with the aid of the adhesive. All components (lens holder, shaped part, sensor carrier) may be arranged with respect to the respective other components. It is also possible to fix individual components and to position only the respective other components or another component to the fixed components. Or, all components are positioned with respect to one another and moved, if necessary.

The recess may be configured as a rectangular trench or as a rounded groove or as a shaped hemisphere, for example.

Furthermore, a shaped part for installation in a camera module is claimed. The shaped part includes at least one portion, which may be accommodated in a recess of a lens holder. Moreover, the shaped part is configured to be attached on a sensor carrier and/or to be fastened to a sensor carrier.

With the aid of this shaped part, a simple and reliable joint between a sensor carrier and a lens holder is possible; it being additionally possible to utilize all degrees of freedom in the orientation of the sensor carrier in relation to the lens holder.

In one specific embodiment of the shaped part, this shaped part includes lower projections and upper projections, with the aid of which a form fit may be formed between a sensor carrier and the shaped part.

This specific embodiment offers the advantage that fasteners may be saved and the camera configuration may be made smaller.

Furthermore, a method for installing a camera module is claimed.

The camera module includes a sensor carrier, a shaped part and a lens holder. The method includes the following steps:
  applying an adhesive to the lens holder;
  positioning the lens holder and the sensor carrier to one another;
  fixing the lens holder to the shaped part and/or to the sensor carrier.

This method offers the advantage that a very flexible and simple attachment of the lens holder on the sensor carrier is possible. With the aid of the adhesive joint, an orientation along all spatial directions and/or a corresponding rotation or inclination about an arbitrary axis may take place.

Curing effects of the adhesive may also be taken into consideration in the positioning of the lens holder with respect to the sensor carrier. Consequently, it is possible that the position during positioning of the lens holder differs from the final position after the adhesive has cured.

In one further specific embodiment of the method, an image sensor is attached on the sensor carrier, and at least one optical element is situated in the lens holder. In the step of positioning, the lens holder and the sensor carrier may be positioned in relation to one another so that the image sensor is situated in an image plane of the at least one optical element after the lens holder has been fixed.

This specific embodiment offers the advantage that very exact positioning of the lens holder or of a lens system present in the lens holder to the image sensor is possible. In this way, an optimal depiction of surroundings on the image sensor may be made possible. This image plane may be understood to mean an image plane in which an image sensor should be arranged in order to generate the best possible image. The positioning may take place, for example, using known methods such as the "active alignment." The optical element may be one or multiple lenses, for example, or further optical elements customary for a lens system.

In one further specific embodiment of the method, the lens holder has at least one recess. During the application of the adhesive, the adhesive is added into the at least one recess. In the step of positioning, at least one portion of the shaped part is moved in the at least one recess containing adhesive so that a lateral displacement of the sensor carrier with respect to the lens holder and/or tilting of the sensor carrier with respect to the lens holder take(s) place.

This optionally additional step enables a precise orientation of the lens holder with respect to the sensor carrier. A displacement along all spatial directions and tilting about an arbitrary axis are possible.

It is both possible to first introduce the adhesive into the recess followed by the orientation, and to carry out the orientation first with subsequent introduction of adhesive into the recess.

In one further specific embodiment of the method, the shaped part includes lower projections and upper projections. In an additional step, a form fit is formed between the sensor carrier and the shaped part by placing the sensor carrier onto the lower projections and subsequently bending over the upper projections.

This specific embodiment offers the advantage that a fixed joint already exists between the sensor carrier and the shaped part during the orientation of the components to one another. No separate fasteners are necessary for this joint, so that a simplification of the attachment process is ensured.

Furthermore, the form fit creates a stable and durable joint against environmental conditions. After the upper projections have been bent over, it is also conceivable that the sensor carrier is additionally fixed to the shaped part with the aid of an adhesive. In addition to the form-locked joint, an additional integral joint is thus created.

In one further specific embodiment of the method, this method may include an additional step of attaching the shaped part on the sensor carrier. The attachment is in particular carried out by soldering and/or welding and/or gluing.

This specific embodiment offers the advantage that a very simple attachment of the shaped part on the sensor carrier is possible. Due to the resulting integral bond, this attachment is also stable against outside influences. Depending on the lens holder (carrier) used, different shaped parts may also be used, which may subsequently be attached on the sensor carrier. In this way, identical components may be used for different lens holders in that the shaped part is attached in different areas on the sensor carrier. In general, a flexible kit for constructing different camera modules is thus created.

BRIEF DESCRIPTION OF THE DRAWINGS

Figure 10:
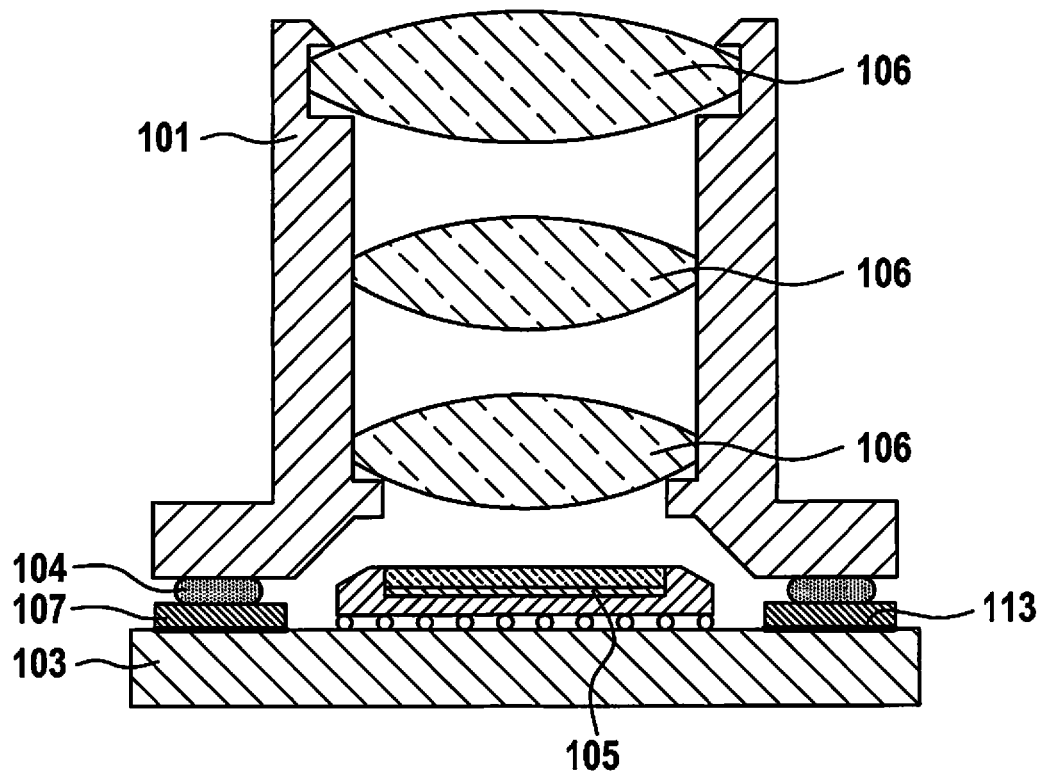
FIG. 10 shows a further exemplary embodiment of the camera module.

FIG. 10 shows an exemplary configuration of the camera module. Lens holder 101 accommodates a lens system which is made up of multiple lenses 106. A shaped part 107 is attached on sensor carrier 103, which is configured as a circuit board (PCB), with the aid of a soldered joint 113. In addition, an image sensor 105 is attached on sensor carrier 103. Both shaped part 107 and image sensor 105 were attached on sensor carrier 103 in a reflow method.

Shaped part 107 is configured for fastening lens holder 101 with the aid of an adhesive 104. Shaped part 107 may be configured continuously over the circumference of lens holder 101 or in segments, so that the adhesive joint with the aid of adhesive 104 may be implemented completely continuously or partially. Shaped part 107 may be configured as a stamped bent part.

Shaped part 107 may be made up of one part or a group of parts. In this exemplary embodiment, shaped part 107 is made at least partially of a metallic material which is suitable for soldering, for example of a stamped bent part.

Figure 1:
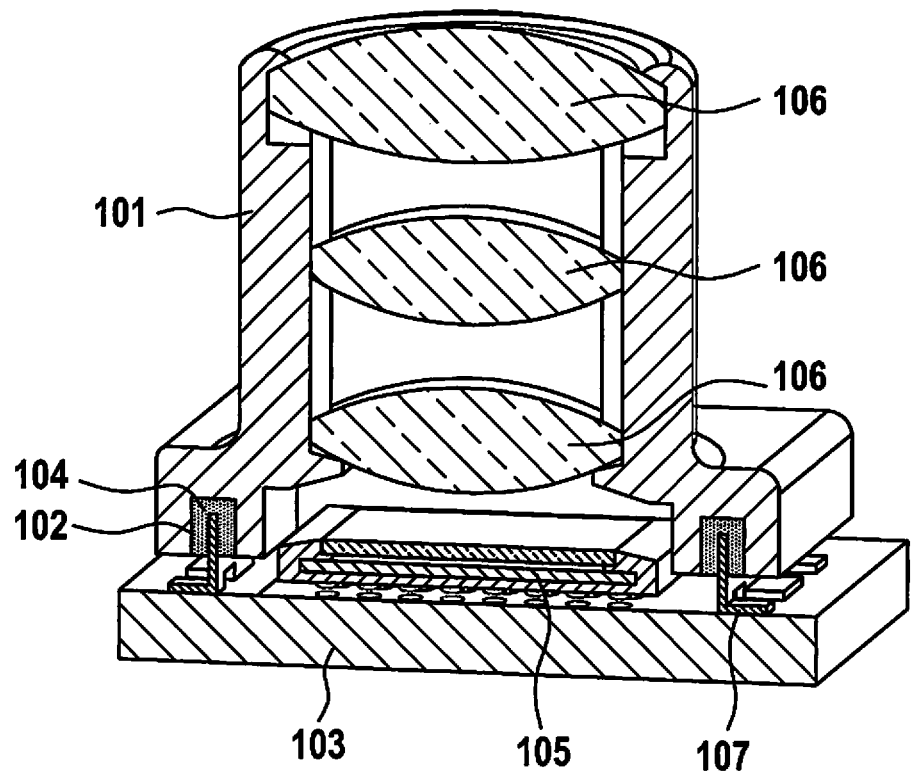
FIG. 1 schematically shows an assembled camera module in a sectional view.
Figure 2:
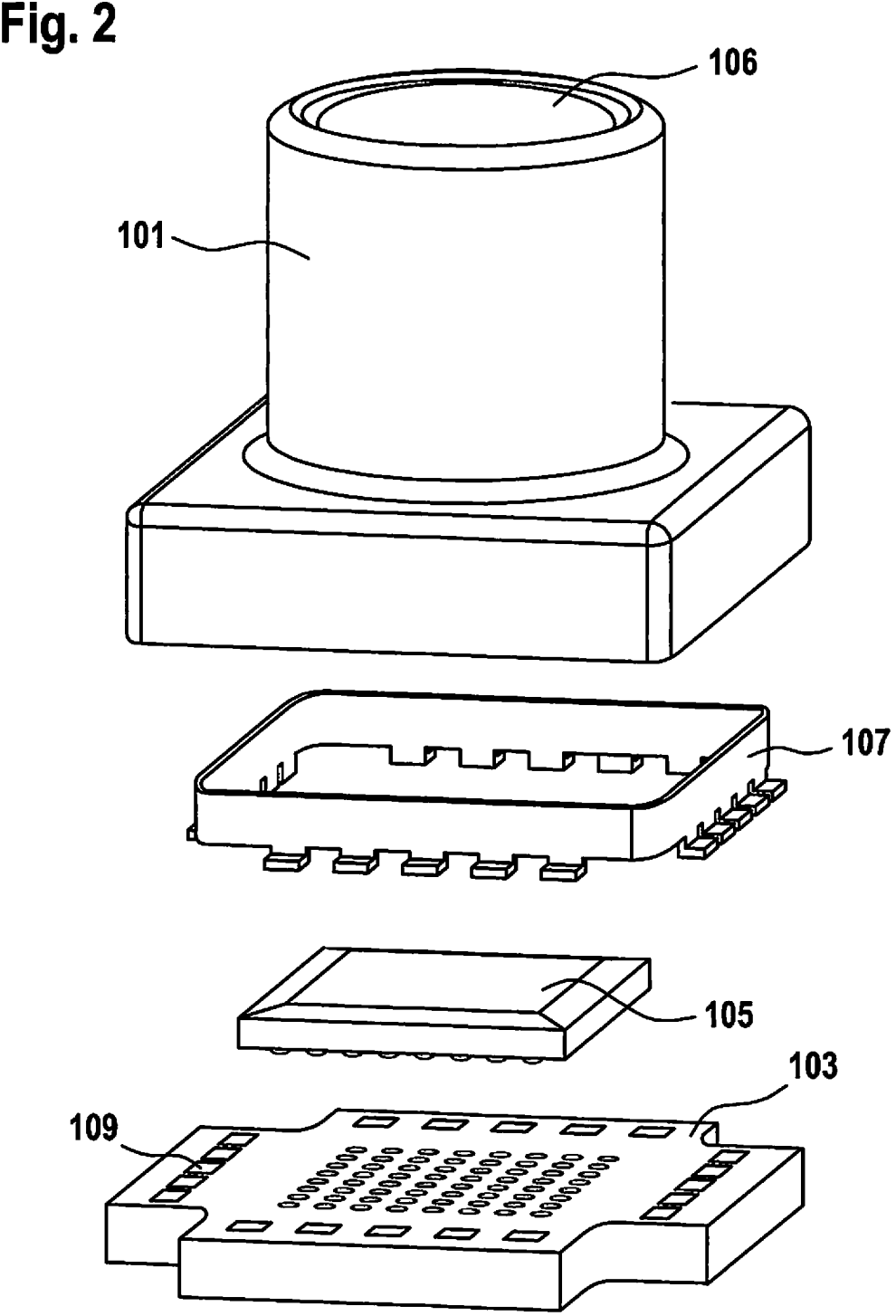
FIG. 2 shows a schematic layout of the camera module in an exploded view.

FIG. 1 shows a further exemplary embodiment of the camera module. Lens holder 101 has a recess 102 in which adhesive 104 and at least a portion of at least one shaped part 107 may be accommodated. Shaped part 107, which is attached on sensor carrier 103 with the aid of a soldered joint 113, completely surrounds image sensor 105 attached on sensor carrier 103. As an alternative, shaped part 107 may also be glued or pushed onto sensor carrier 103. Separate areas 109 may be provided for this purpose on sensor carrier 103, which are shown in FIG. 2.

In this exemplary embodiment, recess 102 of lens holder 101 is provided on a surface of lens holder 101 facing sensor carrier 103. Recess 102 has a continuous design, so that it surrounds lens holder 101 along circumference 311 of lens holder 101 facing the sensor carrier. Recess 102 is provided between outer and inner circumference 311 of lens holder 101. In this example, recess 102 is configured as a trough-shaped trench, which is positioned approximately centrally on the surface of lens holder 101 facing sensor carrier 103. The recess may also be angular or round or, in the case of locally separated recesses, for example, as a cylindrical borehole/recess. Recess 102 is positioned so that the remaining wall thickness of lens holder 101 has sufficient stability. Depending on the material used, the remaining thickness may be several micrometers or even millimeters.

Recess 102 has a depth 313 of approximately 1 mm. The depth is understood to mean the height up to which recess 102 may theoretically be filled with liquid (with negligible surface tension). This corresponds to the extension of recess 102 in the z direction. A possible extension and positioning of recess 102 is shown by way of example in FIG. 3.

In general, lens holder 101 may also have depths 313 of several micrometers up to several millimeters. To ensure sufficient play for orienting lens holder 101 to sensor carrier 103 in the z direction, depth 313 should be selected to be greater than 0.3 mm, in particular greater than 0.5 mm.

Figure 4:
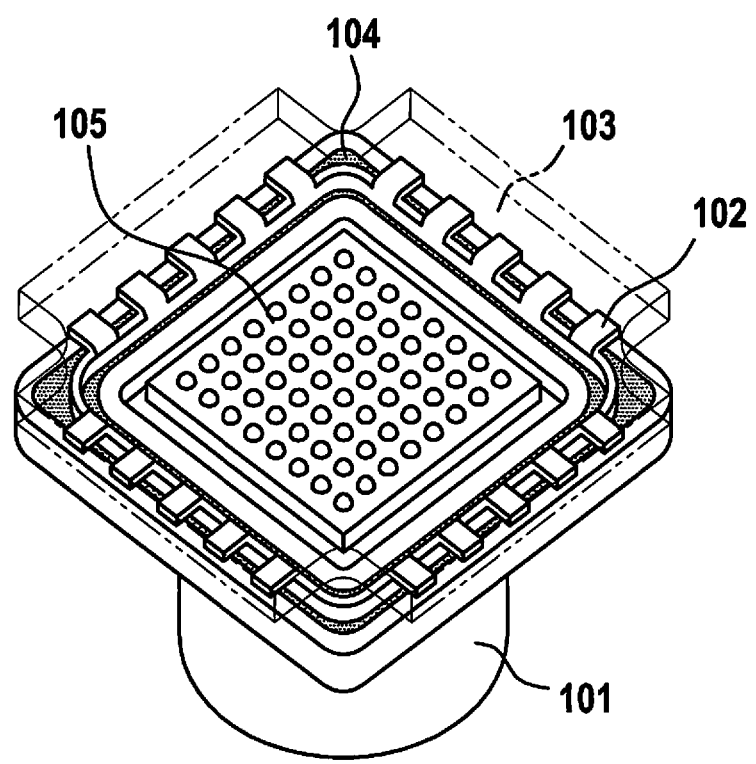
FIG. 4 shows the camera module with a transparent view of a sensor carrier.

FIG. 4 shows the camera module in the assembled state, sensor carrier 103 being shown in a semi-transparent manner.

Figure 5:
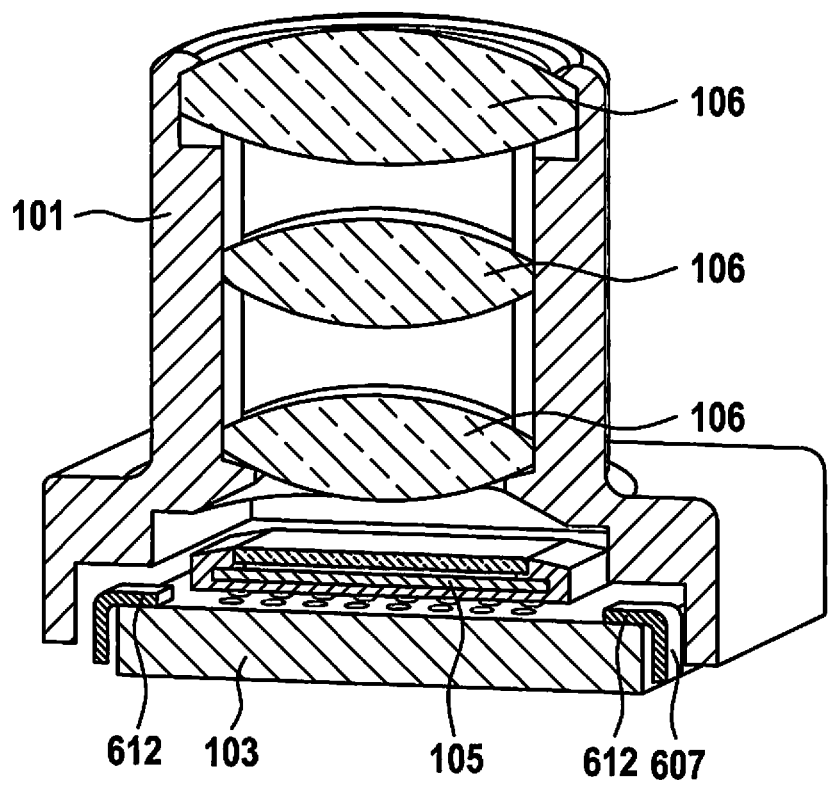
FIG. 5 shows a further exemplary embodiment of the camera module in a sectional view.
Figure 6:
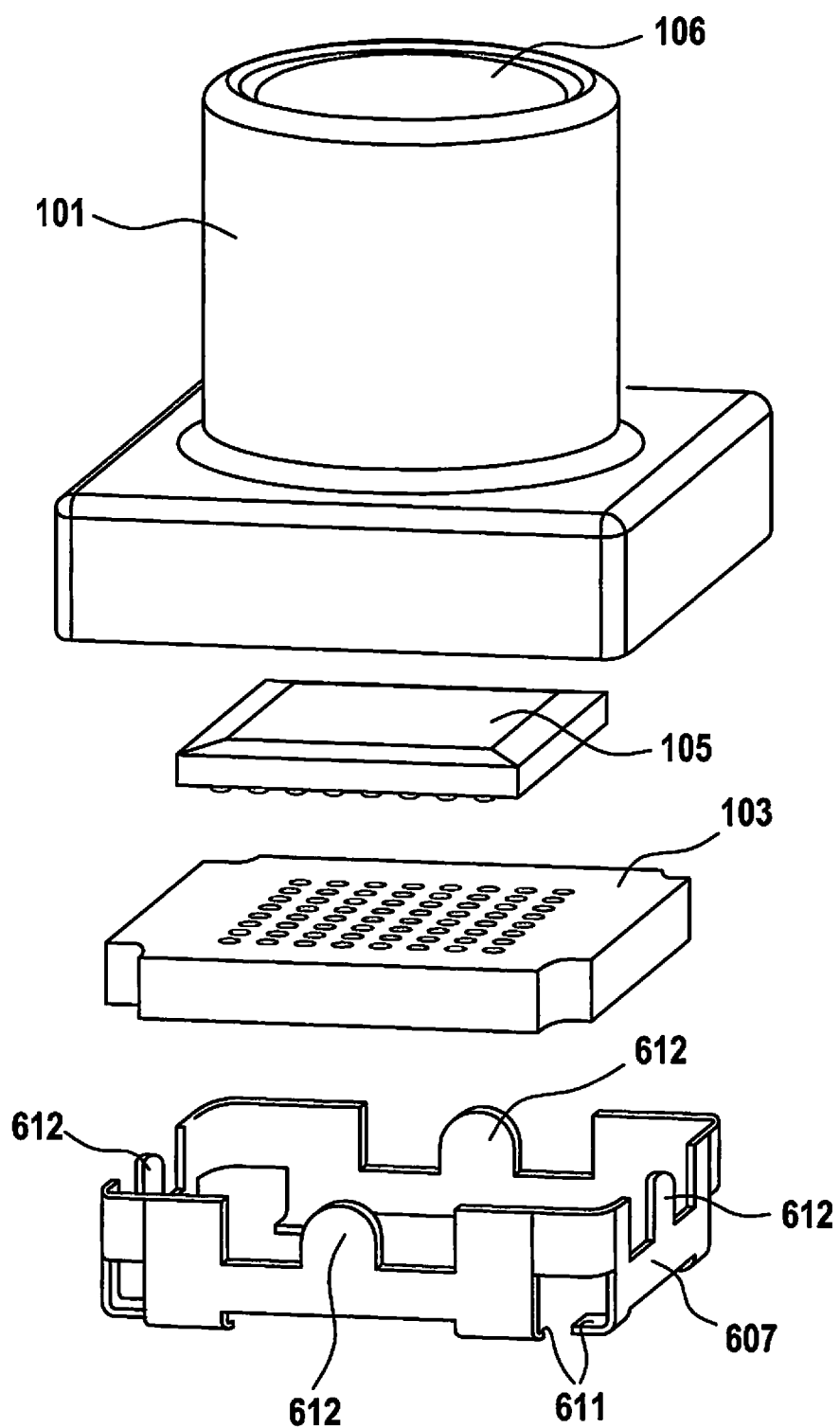
FIG. 6 shows the further exemplary embodiment of the camera module in an exploded view.

FIG. 5 shows a further specific embodiment of the camera module. In this example, sensor carrier 103 is joined to shaped part 607 in a form-locked manner. Shaped part 607 has a special geometry for the form-locked joint, which is shown in FIG. 6. Shaped part 607 includes upper 612 and lower 611 projections. Lower projections 611 are configured so that sensor carrier 103 may be placed thereon. For this purpose, it is introduced into shaped part 607. After the sensor carrier has been placed onto lower projections 611, upper projections 612 may be angled or bent over so that these surround sensor carrier 103. Sensor carrier 103 is consequently bordered from beneath by lower projections 611 and from above by upper projections 612. The lateral dimension of shaped part 607 is selected so that sensor carrier 103 also is not able to slide laterally and consequently, after upper projections 612 have been bent over, is joined to shaped part 607 in a form-locked manner.

Figure 7:
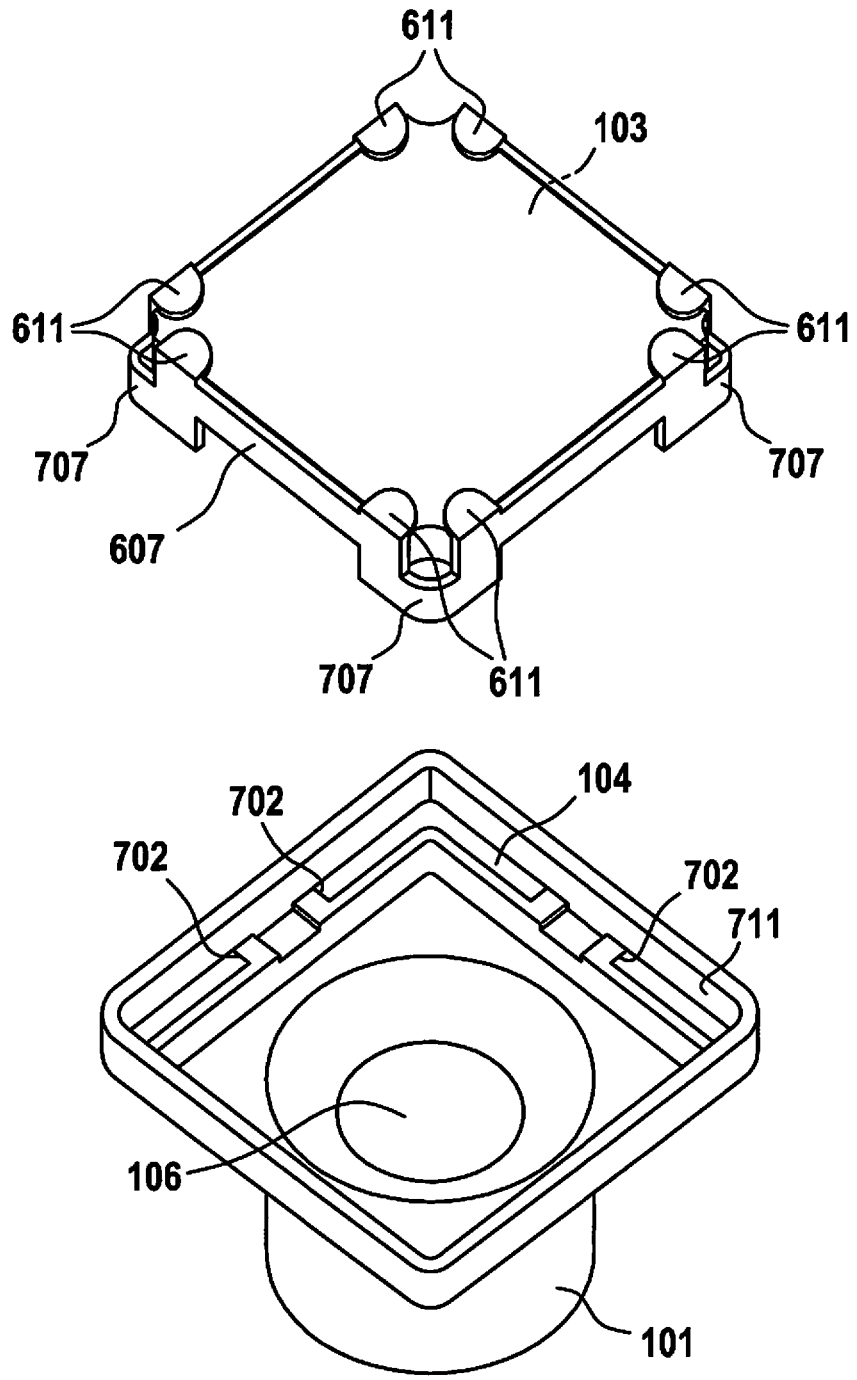
FIG. 7 shows the further exemplary embodiment of the camera module including a sensor carrier accommodated in a form-locked manner.

FIG. 7 again shows sensor carrier 103 joined to shaped part 607 in a form-locked manner.

In this exemplary embodiment, lens holder 101 has four recesses 702, which are each positioned at the corners of lens holder 101. Again, the depths of recesses 702 are approximately 1 mm and may be varied corresponding to the preceding example. Again, recesses 702 are situated on a surface of lens holder 101 facing sensor carrier 103. In this example, outside wall 711 of lens holder 101 is extended upwardly, whereby sensor carrier 103 and shaped part 607 may be almost completely accommodated in lens holder 101. The wall height 711 may be configured so that sensor carrier 103 and shaped part 607 may be accommodated completely or only in portions. Upwardly extended wall 711 offers additional protection for the camera module. The lateral extension of sensor carrier 103 is smaller in this example than the inside dimensions of lens holder 101 in the area in which sensor carrier 103 is accommodated.

Recesses 702 are also provided approximately centrally, based on the thickness of lens holder 101. This has the advantage that the remaining wall thickness of lens holder 101 in the areas of recess 102, 702 still ensures sufficient stability.

Figure 8:
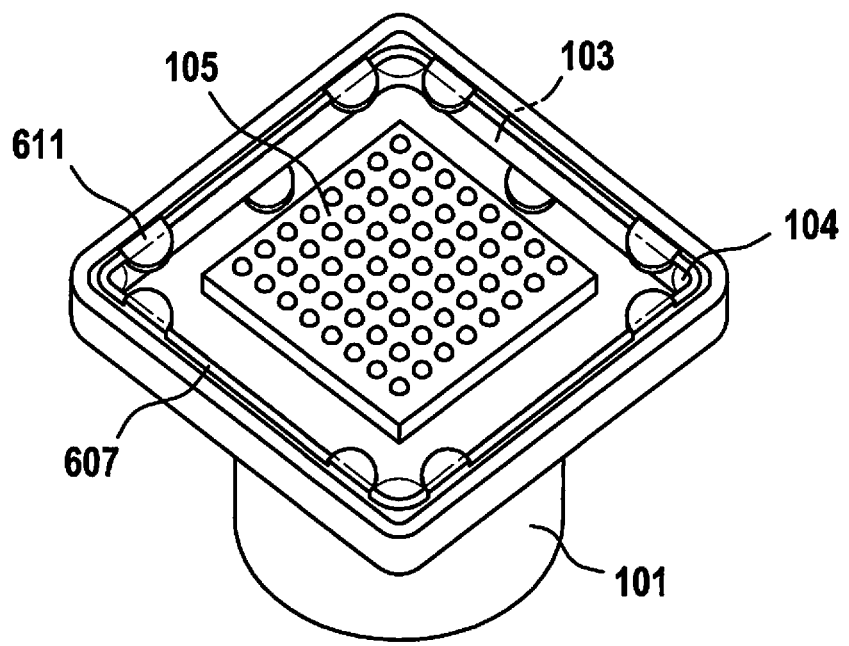
FIG. 8 shows the further exemplary embodiment of the camera module with a transparently illustrated sensor carrier.

Shaped part 607 and lens holder 101 are matched to one another with respect to their geometry. In this exemplary embodiment, shaped part 607 includes four portions 707, which may (simultaneously) be positioned in four recesses 702 of lens holder 101. These portions 707 each extend around the four corners of shaped part 607. FIG. 8 shows the camera module in the assembled state, in which four portions 707 are accommodated in four recesses 702. Shaped part 607 may be configured as a stamped bent part.

Figure 9:
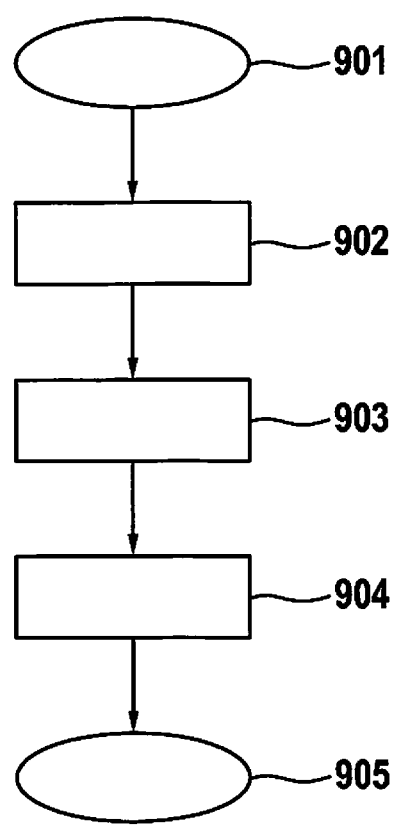
FIG. 9 shows a method diagram.

FIG. 9 shows an exemplary method sequence for assembling the described camera module, made up of a sensor carrier 103, a shaped part 107 and a lens holder 101. The method starts in step 901.

In step 902, an adhesive 104 is applied to lens holder 101. Depending on the design of lens holder 101, adhesive 104 may be applied rather thin, or such an amount of adhesive 104 may be selected that, for example, a recess 102, 702 of lens holder 101 is filled to a predefined height.

In step 903, lens holder 101 and shaped part 107 and/or sensor carrier 103 are positioned in relation to one another. Due to used adhesive 104, an orientation in all directions is possible. Furthermore, lens holder 101 may be tilted or inclined in all directions since no fixed rotation axes or moving directions are predefined by adhesive 104. If at least one recess 102, 702 is formed in lens holder 101, the amount of adhesive 104 and the depth of recess 102, 702 allow a very large displacement in the z direction.

In step 904, shaped part 107, 607 is fixed on lens holder 101. Adhesive 104 is cured to fix shaped part 107, 607. Depending on used adhesive 104, different methods are possible. Adhesive 104 may be cured with the aid of UV light, for example. As an alternative, curing with the aid of heat or cold is also possible. It is also possible to combine different curing methods in order to accelerate the processes. For example, a pre-curing of adhesive 104 with the aid of UV radiation may take place, and adhesive 104 may be treated by a further method, for example by further heating, in a further process step for complete curing.

The method ends in step 905.

The described method may include an additional step of attaching shaped part 107 on sensor carrier 103. In this step, shaped part 107 is attached, for example, with the aid of soldering and/or welding and/or gluing. This step may advantageously be carried out prior to step 902.

If shaped part 607 includes lower projections 611 and upper projections 612, the method may include an additional step. In this step, a form fit is formed between sensor carrier 103 and shaped part 607 by placing sensor carrier 103 onto lower projections 611 and subsequently bending over upper projections 612. The form-locked attachment may be carried out mechanically and at any arbitrary point in time of the method. The form-locked attachment may take place prior to the positioning. It is also conceivable that sensor carrier 103 is used in the method already equipped with image sensor 105 and shaped part 607.

In one further exemplary embodiment of the method, an image sensor 105 is attached on sensor carrier 103, and lens holder 101 carries at least one optical element. In step 904 of positioning lens holder 101, lens holder 101 is positioned to sensor carrier 103 so that image sensor 105 may be situated in an image plane of the at least one optical element after lens holder 101 has been fixed. Possibly arising changes in position of lens holder 101 after adhesive 104 has cured may be taken into consideration in this positioning. For the positioning, known methods, such as "active alignment," may be used.

In general, steps 902 and 903 may also be reversed, so that initially an exact orientation of shaped part 107, 607 in relation to lens holder 101 takes place, and subsequently the adhesive is added into the at least one recess 102, 702.

Figure 3:
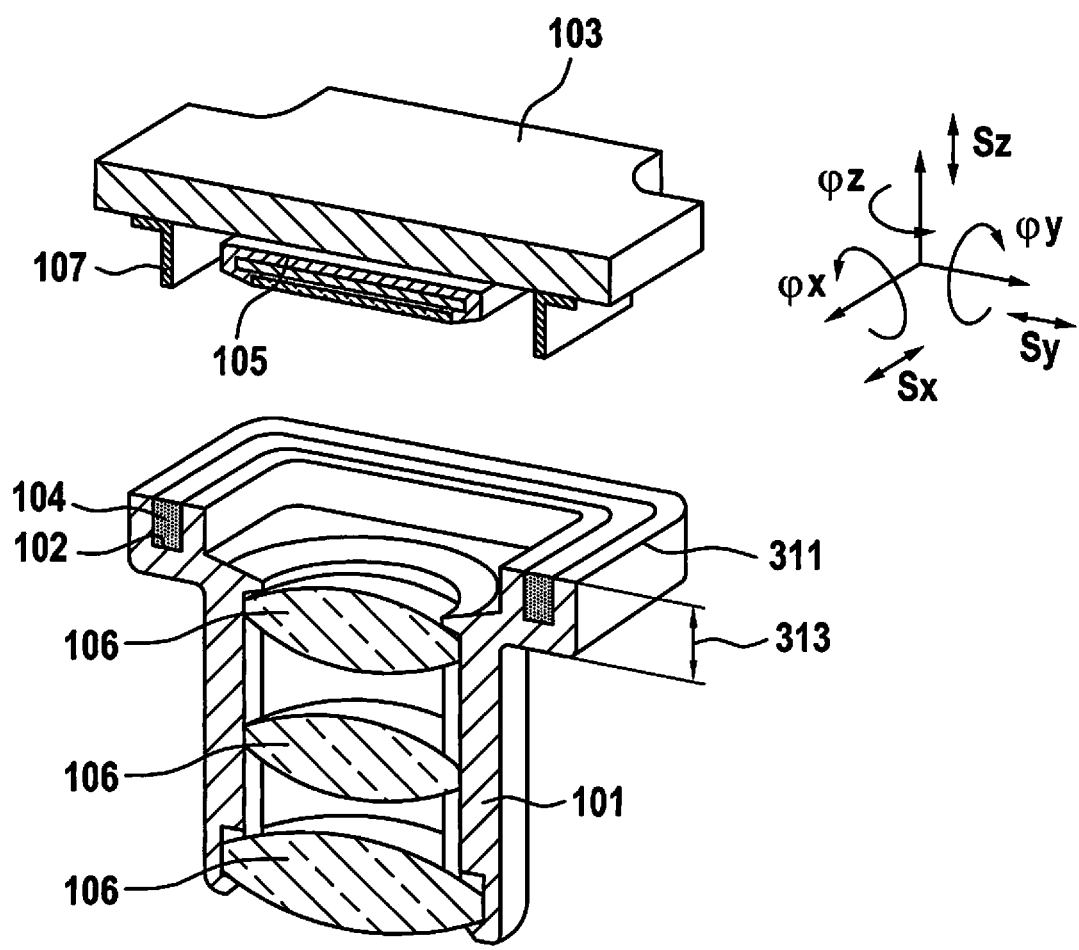
FIG. 3 shows a section through the camera module in an exploded view.

FIG. 3 once more illustrates the degrees of freedom that may be utilized in the positioning of lens holder 101 and sensor carrier 103 in relation to one another. Displacements in all spatial directions of a Cartesian coordinate system Sx, Sy, Sz and rotations px, py, pz about its three axes are possible. Depending on the design of recesses 102, 702 and of the portions of shaped part 107, 607, more or less play may be provided. Depending on the tolerance range of the components used for the camera module, consequently lens holder 101 and shaped parts 107, 607 may be selected, in which recesses 102, 702 and the portions of shaped parts 107, 607 have a larger or a smaller play. As a result of a smaller play, installation space and adhesive 104 may possibly be saved. A larger play may better compensate for tolerances, whereby it is also possible to use parts having a larger tolerance range and consequently costs may be reduced.

What is claimed is:

1. A camera module for a vehicle, comprising: a lens holder which holds at least one lens; and a sensor carrier which carries an image sensor, radiation striking the image sensor being at least partially conducted through the at least one lens which is held by the lens holder; and a shaped part attached to the sensor carrier by a solder joint, a weld, or glue, wherein the lens holder has at least one recess, the at least one recess receives at least one portion of the shaped part and an adhesive, the lens holder being fastened to the at least one portion of the shaped part by the adhesive in the at least one recess, and the lens holder being secured to the sensor carrier by the shaped part;
    wherein the at least one recess is formed on a surface of the lens holder facing the sensor carrier and is configured as a trough-shaped trench.

2. The camera module of claim 1, wherein the at least one recess has a continuous configuration, so that it surrounds the lens holder along an entire circumference of the lens holder, in particular it being provided that the recess surrounds the lens holder along the circumference of the lens holder facing the sensor carrier.

3. The camera module of claim 1, wherein the at least one recess includes at least two recesses, the at least two recesses being provided spatially separated from one another, each of the at least two recesses receiving a respective portion of the shaped part and a respective portion of the adhesive, the lens holder being fastened to the respective portions of the shaped part by the respective portions of the adhesive in the at least two recesses.

4. A camera module for a vehicle, comprising: a lens holder which holds at least one lens; and a sensor carrier which carries an image sensor, radiation striking the image sensor being at least partially conducted through the at least one lens which is held by the lens holder; and a shaped part including projections, the shaped part being attached to the sensor carrier by form fit via the projections, wherein the lens holder has at least one recess, the at least one recess receives at least one portion of the shaped part and an adhesive, the lens holder being fastened to the at least one portion of the shaped part by the adhesive in the at least one recess, and the lens holder being secured to the sensor carrier by the shaped part;
    wherein the at least one recess is formed on a surface of the lens holder facing the sensor carrier and is configured as a trough-shaped trench.

5. The camera module of claim 4, wherein the at least one recess has a continuous configuration, so that it surrounds the lens holder along an entire circumference of the lens holder, in particular it being provided that the recess surrounds the lens holder along the circumference of the lens holder facing the sensor carrier.

6. The camera module of claim 4, wherein the at least one recess includes at least two recesses, the at least two recesses being provided spatially separated from one another, each of the at least two recesses receiving a respective portion of the shaped part and a respective portion of the adhesive, the lens holder being fastened to the respective portions of the shaped part by the respective portions of the adhesive in the at least two recesses.

7. A method for assembling a camera module, the method comprising:
    attaching a shaped part to a sensor carrier, the sensor carrier carrying a sensor, the shaped part being attached to the sensor carrier by a solder joint, a weld, or glue;
    applying adhesive into a recess of a lens holder, the lens holder holding at least one lens; positioning the shaped part and the lens holder relative to one another, and inserting at least a portion of the shaped part into the recess of the lens holder; and
    curing the adhesive, the lens holder being fastened to the shaped part by the cured adhesive in the recess, and the lens holder being secured to the sensor carrier by the shaped part;
    wherein in the positioning, the sensor carrier and the lens holder are positioned relative to one another so that radiation striking the image sensor carried by the sensor carrier is at least partially conducted through the at least one lens which is held by the lens holder;
wherein the recess is formed on a surface of the lens holder facing the sensor carrier and is configured as a trough-shaped trench.

8. The method as recited in claim 7, wherein the lens holder and the sensor carrier are positioned in relation to one another so that the image sensor is situated in an image plane of the at least one lens after the lens holder has been fixed in place.

9. A method for assembling a camera module, the method comprising:
    attaching a shaped part to a sensor carrier, the sensor carrier carrying a sensor, the shaped part having upper projections and lower projections, the shaped part being attached to the sensor carrier by a placing the sensor carrier on the lower projections of the shaped part, and subsequently bending over the upper projections;
    applying adhesive into a recess of a lens holder, the lens holder holding at least one lens; positioning the shaped part and the lens holder relative to one another, and inserting at least a portion of the shaped part into the recess of the lens holder;
    and curing the adhesive, the lens holder being fastened to the shaped part by the cured adhesive in the recess, and the lens holder being secured to the sensor carrier by the shaped part;
    wherein in the positioning, the sensor carrier and the lens holder are positioned relative to one another so that radiation striking the image sensor carried by the sensor carrier is at least partially conducted through the at least one lens which is held by the lens holder;
    wherein the recess is formed on a surface of the lens holder facing the sensor carrier and is configured as a trough-shaped trench.

10. The method as recited in claim 9, wherein the lens holder and the sensor carrier are positioned in relation to one another so that the image sensor is situated in an image plane of the at least one lens after the lens holder has been fixed in place.

* * * * *